United States Patent [19]
Saito et al.

[11] Patent Number: 5,398,314
[45] Date of Patent: Mar. 14, 1995

[54] APPARATUS FOR CREATING OPERATION DATA CONCERNING OPERATING DEVICE

[75] Inventors: Mitsuru Saito; Toshiaki Nakahara, both of Tokyo, Japan

[73] Assignee: Nippon Filcon Co., Ltd., Tokyo, Japan

[21] Appl. No.: 58,742

[22] Filed: May 10, 1993

[30] Foreign Application Priority Data

May 12, 1992 [JP] Japan .................. 4-161605

[51] Int. Cl.⁶ ............................. G06F 15/46
[52] U.S. Cl. ............................ 395/161
[58] Field of Search ............ 395/145, 147, 154, 161; 364/130, 146, 149, 150, 188, 191, 474.24, 474.28, 478

[56] References Cited

U.S. PATENT DOCUMENTS

| | | | |
|---|---|---|---|
| 4,656,603 | 4/1987 | Dunn | 395/161 X |
| 5,019,961 | 5/1991 | Addesso et al. | 395/161 X |
| 5,163,006 | 11/1992 | Deziel | 395/161 X |
| 5,189,626 | 2/1993 | Colburn | 395/161 X |

Primary Examiner—Heather R. Herndon
Assistant Examiner—Cliff Nguyen
Attorney, Agent, or Firm—Beveridge, DeGrandi, Weilacher & Young

[57] ABSTRACT

An apparatus for creating operation data with which a computer operates a machine tool, a measuring machine, or the like. The apparatus has a display unit, an input unit, a storage unit, an output unit, and a processing unit. The storage unit comprises a CAD data file of original drawings, a command menu data file, an operation command CAD data file, an operation command data file, and an operation data file. The processing unit has a first processing device for performing processes such as a designing, editing, and displaying a CAD drawing, a second processing device for creating and storing operation command CAD data, a third processing device for creating and storing operation command data, a fourth processing device for creating and storing operation data, and a fifth processing device for outputting the operation data.

12 Claims, 12 Drawing Sheets

Fig. 3

| | |
|---|---|
| Figure type: | Circle |
| Line type: | Solid line |
| Color: | Black |
| X coordinate: | 0.0 |
| Y coordinate: | 0.0 |
| R value: | 5.0 |
| Start angle: | 90° |
| End angle: | 270° |
| • • • | |

Fig. 4

| 6Figure type: | Circle |
|---|---|
| Line type: | Dotted line |
| Color: | Red |
| X coordinate: | 0.0 |
| Y coordinate: | 0.0 |
| R value: | 5.0 |
| Start angle: | 90° |
| End angle: | 270° |
| • | |
| • | |
| • | |

Fig. 5

| Figure type: | Character |
|---|---|
| Color: | Blue |
| X coordinate: | 0.0 |
| Y coordinate: | 0.0 |
| Contents:<br>"Start angle:<br>End angle: | <br>+20°<br>-20°" |
| •<br>•<br>•<br>•<br>•<br>• | |

1

2

3

"Start angle: +20°
End angle: -20°"

Fig. 10

| | |
|---|---|
| Figure type: | Circle |
| Line type: | Solid line |
| Color: | Black |
| X coordinate: | 0.0 |
| Y coordinate: | 0.0 |
| R value: | 5.0 |
| Start angle: | 0° |
| End angle: | 360° |
| • • • | |

Fig. 11

| | |
|---|---|
| Figure type: | Circle |
| Line type: | Dotted line |
| Color: | Red |
| X coordinate: | 0.0 |
| Y coordinate: | 0.0 |
| R value: | 5.0 |
| Start angle: | 0° |
| End angle: | 360° |
| • | |
| • | |
| • | |

| Figure type: | Character |
|---|---|
| Color: | Blue |
| X coordinate: | 0.0 |
| Y coordinate: | 0.0 |
| Contents: | |

"X: +15.0"
        "X: +30.0"
        "X: +45.0"
        "X: +60.0"

•

•

•

•

•

APPARATUS FOR CREATING OPERATION DATA CONCERNING OPERATING DEVICE

BACKGROUND OF THE INVENTION

The present invention relates to an apparatus for creating data for commanding the operation of an object machine.

Since machines in general such as machine tools having computers, e.g. NC machine tools which are controlled by programs based on specific numerical data, have been developed and sophisticated, the operability thereof has been remarkably improved. This trend of automatic control has also remarkably advanced in the field of measuring machines, which measure various data.

The automatic machine operations, which are controlled by computers using programs which contain numeric values, are very suitable for producing or measuring a large number of substances with a small number of types, thereby providing high efficiency for this purpose.

However, these automatic operations are not suitable for producing a small number of substances with a large number of types, resulting in low efficiency.

This is because data commanding change of the operation of each machine which produces or measures a substance which should be created depend on the change of the substance. In other words, to change data for commanding operations with the conventional technologies, CAD data of an original drawing must be changed, and, since all of the steps of creating command data are required, this results in a long work time and serious risk.

In the conventional apparatus, since CAD data of original drawings are directly converted into operation data, changes of operation data result in changes of the CAD data of the original drawings or changes of the programs per se which convert CAD data into operation data.

If the CAD data of the original drawings were changed, it would become very difficult to know what was the initial CAD data, how the initial CAD data was changed, and which is the changed data.

In addition, if the CAD data of the original drawings were changed, the risk of erasing the initial CAD data would become high. Thus, it is stated that direct changes of the initial CAD data should be avoided.

Moreover, from the view point of efficiency, changes of programs which convert CAD data into operation data are very difficult.

In other words, with conventional apparatus, if the CAD data of the original drawings is data of a circle, then the original CAD data accords with the operation data of programs such as "measure the diameter of the circle" or "make a round hole by using the drill." Changing the operation data into such operation data as "measure the circumference of a particular circle" or "make a square hole" from the programs above requires changes of the entire programs.

Operation data, e.g., "turn on the light" or "supply oil" which do not accord with the CAD data of the original drawings may be made to accord with CAD data of original drawings depending on programs. Thus, when operation data such as "designating a lamp to be turned on when a hole with a diameter of 10 mm is measured" or "designating the amount of oil to be supplied when a hole with a diameter of 10 mm is made" is changed, the program itself must be changed. Thus, the above described very troublesome work is required.

To solve such problems, the inventors of the present invention have invented an apparatus which is referred to in as U.S. patent application Ser. No. 08/053,768 filed on Apr. 27, 1993. In this apparatus, operation command data is created with which common machines of a group are operated. The operation command data is stored in a data file. The operation data is changed corresponding to the format of a particular machine and thereby operation data for operating the particular machine is created. Thus, with the operation data, the particular machine is operated.

SUMMARY OF THE INVENTION

The present invention is an apparatus for creating operation data. In the apparatus, operation command data is created with which common machines of a group are operated. This data is continuously changed to correspond with the format of a particular machine and thereby operation data thereof is created. The resultant operation data is stored and output.

Because no operation command data for common machines is stored, the apparatus is advantageously simplified and is capable of outputting operation data for operating a particular machine in a short period of time.

With respect to the capabilities for outputting operation data of other specific machines included in the group, the apparatus disclosed in the application Ser. No. 08/053,764 is comparatively superior to the apparatus according to the present invention.

An object of the present invention is to provide an apparatus for quickly and easily creating data with which a corresponding machine operates.

A first aspect of the present invention is an apparatus for producing working or operation data comprising: a display unit; an input unit; a storage unit; an output unit; and a processing unit; wherein:

(I) the display unit is adapted to display at least a computer aided design (CAD) drawing, computer aided design (CAD) data, an operation command menu, a change command menu and processing means input commands;

(II) the storage unit comprises:

(A) a CAD data file of original drawings having a plurality of storage locations for storing CAD data of an original drawing;

(B) a command menu data file for storing data necessary for displaying the operation command menu, the change command menus, the operation data change command menus, and the processing means input commands;

(C) an operation command CAD data file for storing operation command CAD data, the operation command CAD data being created by selecting an operation command item on the operation command menu, designating a CAD drawing of an original drawing with the input unit, and inputting data when necessary;

(D) an operation command data file for storing operation command data, the operation command data being created by extracting CAD data necessary for operating common machines of a group from the operation command CAD data as numeric and character data to form operation command data; and (III) the processing unit comprises:

(a) a first processing device for performing processes such as designing, editing, and displaying a CAD drawing;

(b) a second processing device for creating command CAD data and for storing the data in the operation command CAD data file, the operation command CAD data being created by selecting an operation command item on the operation command menu disposed on the display unit, designating a CAD drawing of an original drawing displayed on the display unit through a first process with the input unit, and inputting data when necessary;

(c) a third processing device for creating operation data and for storing the operation data in an operation data file, the operation data being created by changing operation command data stored in the operation command data file to correspond with the format of the machine, the operation command data being created by extracting CAD data necessary for operating the common machines of the group from the operation command CAD data as numeric and character data; and (d) a fourth processing device for outputting the operation data, the operation data being changed to correspond with the format of the machine.

A second aspect of the present invention is the apparatus according to the first aspect thereof; wherein:

the storage unit (II) further comprises, instead of (D):

(E) a change command CAD data file for storing change command CAD data, the change command CAD data being created by selecting a change command item on the change command menu when necessary, and inputting data for changing the operation command CAD data, with which the common machines of the group operate;

(F) an operation data file for storing operation data, the operation data being created by changing the operation command data in accordance with the change command data and changing the resultant data to correspond with the format of the machine to be operated in a particular manner, the operation command data being created by extracting the CAD data, which is necessary to operate the common machines of the group, as numeric and character data, the change command data being created by extracting the CAD data, which is necessary to change data for operating common machines of the group, from the change command CAD data as numeric and character data; and the processing unit (III) further comprises, instead of (c):

(e) a fifth processing device for creating change command CAD data and for storing the data in a change command CAD data file, the change command CAD data being created by selecting a change command item on the change command menu displayed on the display unit when necessary, and inputting data for changing the operation command CAD data, with which the common machines of the group operate;

(f) a sixth processing device for creating operation data and for storing the data in the operation data file, the operation data being created by extracting CAD data necessary for operating the common machines of the group as numeric and character data thereby to form operation command data, the operation command data being changed by means of change command CAD data=-file to correspond with the format of the machine, the change command CAD data being created by extracting the CAD data for changing data necessary for the operation of the common machines of the group from the operation command CAD data as numeric and character data.

A third aspect of the present invention is the apparatus according to the first aspect thereof, wherein the storage unit (II) further comprises:

(G) an operation data change command CAD data file for storing operation data change command CAD data, the operation data change command CAD data being created by selecting a change command item on the operation data change command menu when necessary, and inputting data for changing the operation data;

(H) a change operation data file for storing change operation data, the change operation data being created by changing operation data based on operation data change command data, the operation data change command data being created by extracting the CAD data necessary for changing the operation data from the operation data change command CAD data as numeric and character data;

the processing unit (III) further comprises, instead of (d):

(g) a seventh processing device for creating operation data change command CAD data and for storing the data in an operation data change command CAD data file, the operation data change command CAD data being created by selecting a change command item on the operation data change command menu displayed on the display unit when necessary, and inputting data for changing the operation data;

(h) an eighth processing device for creating change operation data and for storing the change operation data in a change operation data file, the change operation data being created by changing operation data stored in an operation data file based on operation data change command data, the operation data change command data being created by extracting the CAD data necessary for changing data of the operation data from the operation data change command CAD data as numeric and character data; and (i) a ninth processing device for outputting the change operation data changed based on the operation data change command data.

A fourth aspect of the present invention is the apparatus according to the second aspect thereof, wherein:

the storage unit (II) further comprises:

(G) an operation data change command CAD data file for storing operation data change command CAD data, the operation data change command CAD data being created by selecting a change command item on the operation data change command menu when necessary, and inputting data for changing data of the operation data;

(H) a change command data file for storing change operation data, the change operation data being created by extracting the CAD data necessary for changing the data of the operation data from the operation data change command CAD data as numeric and character data; and the processing unit (III) further comprises, instead of the processing device (d):

(g) a seventh processing device for creating the operation data change command CAD data and for storing the data in the operation data change command CAD data file, the operation data change command CAD data being created by selecting a change command item on the operation data change command menu displayed on the display unit when necessary, and inputting data for changing the operation data;

(h) an eighth processing device for creating change operation data and for storing the data in the change operation data file, the change operation data being created by changing the operation data stored in the operation data file based on operation data change command data, the operation data change command data being created by extracting the CAD data for changing the operation data from the operation data change command CAD data as numeric and character data.

A fifth aspect of the present invention is the apparatus according to one of the first to fourth aspects thereof, wherein the machine is a machine tool.

A sixth aspect of the present invention is the apparatus according to one of the first to fourth aspects thereof, wherein the machine is a measuring machine.

BRIEF DESCRIPTION OF THE INVENTION

FIG. 3 shows a schematic diagram showing CAD data of an original drawing.

FIG. 4 shows a schematic diagram showing operation command CAD data.

FIG. 5 shows a schematic diagram showing change command CAD data.

FIG. 10 shows a schematic diagram showing CAD data of an original drawing.

FIG. 11 shows a schematic diagram showing operation command CAD data.

PREFERRED EMBODIMENT OF THE INVENTION

The operation command data according to the present invention means data which is extracted from operation command CAD data. In addition, the operation data according to the present invention means data where operation command data was changed to data with which a predetermined machine operates. Moreover, the change operation data means data into which operation data which has been created is changed.

A common machine of a group means a general machine included in a particular group. A particular machine means a machine included in the group. For example, an NC lathe is a common machine of a group. On the other hand, an M lathe made by company A is a particular machine.

The first aspect of the present invention is to create desired operation data from operation command CAD data.

Figure 2:
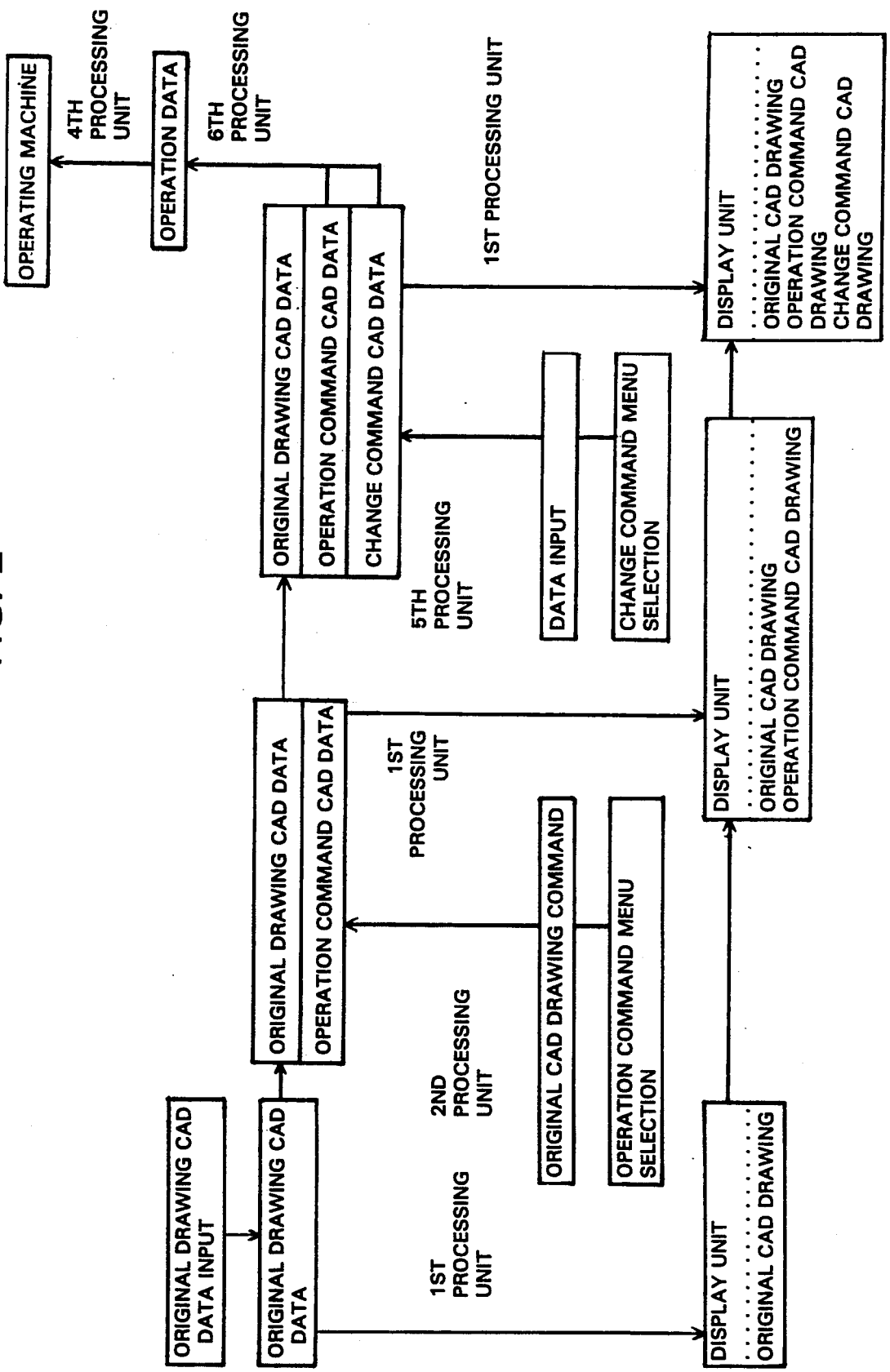
FIG. 2 shows a flow chart showing a processing means of the apparatus of the example.

FIG. 2 is a flow chart showing the overall operations of the apparatus according to the present invention. With reference to this figure, the operations of the apparatus will be apparent. The apparatus performs the following operations: first, the apparatus causes CAD data of an original drawing to be displayed; then the apparatus prompts the user for an operation command item from an operation command menu; then the apparatus creates a CAD drawing of an original drawing; next, the apparatus prompts the user for data when necessary; next the apparatus creates operation command CAD data; then the apparatus creates operation command data, which can be used in common by the machines included in the group, from the operation command CAD data; and finally, the apparatus changes the operation command data to correspond with the format of a particular machine, whereby operation data is formed.

The second aspect of the present invention is to change the data of the operation command data created by the first aspect of the invention in accordance with change command data and create desired operation data based on the changed operation data.

For this, the apparatus performs the following operations: the apparatus prompts the user to choose a change command item from a change command menu; then the apparatus prompts the user to input data for changing the data of operation command CAD data of the common machines of the group, whereby the change command CAD data is created; then the apparatus extracts data necessary for changing the data of the common machines of the group from the change command CAD data, whereby change command data is created; and finally the operation command data is modified in accordance with the change command data.

In other words, the second aspect of the present invention is to change operation data in accordance with change operation command CAD data.

The third aspect of the present invention is to change operation data without the necessity of operation command CAD data.

The apparatus performs the following operations: the apparatus prompts the user to choose a change command item from an operation data change command menu; then the apparatus prompts the user to input data for changing the data of operation data, whereby operation data change command CAD data is created; next, the apparatus extracts therefrom the required CAD data to form the operation data change command data;

finally the apparatus changes the operation data based on the operation data change command data, whereby the change operation data is formed.

Thus, in the third aspect, the apparatus can create change operation data using operation data to be changed without using operation command CAD data.

The fourth aspect of the present invention is to further change, if it is necessary to obtain other changed operation data, the operation data which was changed in the manner according to the second aspect of the invention rather than the change of operation data made by the operation command CAD data used in the second aspect of the invention.

The most important feature of the apparatus according to the present invention is to create operation data for a particular machine directly from operation command CAD data and to output the resultant data. With this feature, operation data of other particular machine included in a group can be directly created. Although the general capabilities of the apparatus of the present invention may be comparatively inferior to those of the conventional apparatuses in the art, desired operation data can be very quickly obtained.

According to the present invention, operation data can be changed without changes to an original drawing. This is because the apparatus can create operation data to correspond with CAD data of an original drawing without changes of the original drawing; this is because, in the creation stage, the apparatus can change the operation data; and because, in addition, since the apparatus can store data in each process stage as data files, it can retrieve data from any data file when necessary.

As machines to be operated, various NC machine tools, measuring machines, and producing machines may be applied. Data being created may be recorded and retrieved on and from recording mediums. In addition, the created data may be directly input from the data creating apparatus of the present invention to the machines to be operated.

EXAMPLES

Example 1

Figure 1:
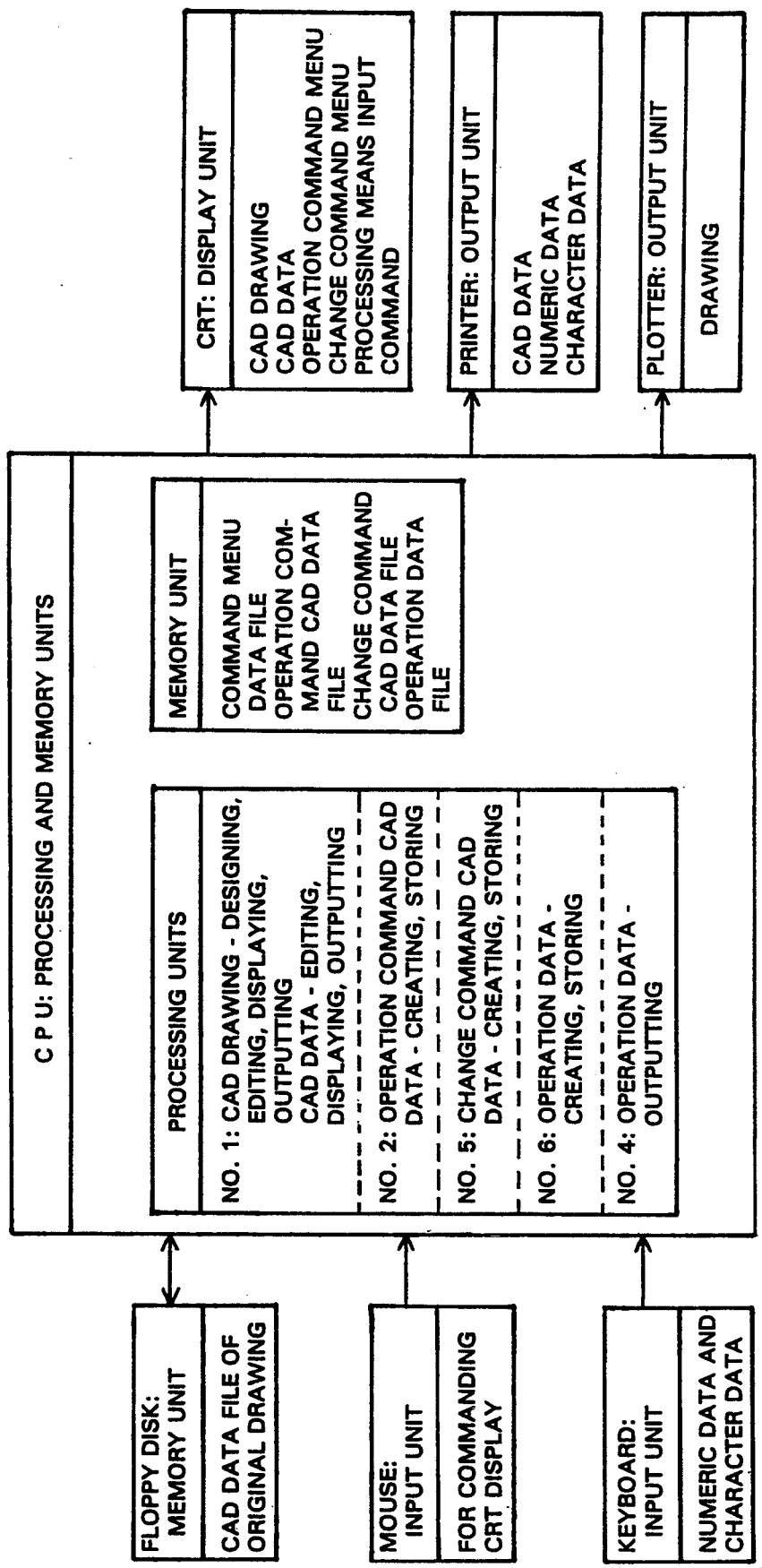
FIG. 1 shows a schematic diagram illustrating the overall construction of an apparatus according to an example of the present invention.

FIG. 1 is a schematic diagram showing the construction of an apparatus according to an example of the present invention.

The apparatus according to this embodiment comprises:

The display unit which comprises a CRT unit for displaying a CAD drawing, CAD data, an operation command menu, a change command menu, and process means input command menu;

The first input unit which comprises a mouse for designating a CAD drawing and one of various command menus shown on the CRT display;

The second input unit which comprises a keyboard for inputting numeric data and character data;

The first output unit which comprises a printer for printing out CAD data, numeric data, and character data;

The second output unit which comprises a plotter for printing out CAD drawings;

The storage unit which comprises a floppy disk drive for storing CAD data of original drawings; and The processing and memory unit which comprises a CPU which executes a sequence of processes and stores various data.

The apparatus according to this embodiment is not limited to the above construction. Instead, for example, a digitizer may be used for displaying the operation command menu or the change command menu. In this case, the menu may be disposed so that it accords with the plane coordinates of the digitizer.

Moreover, the processing and memory unit which are included in the CPU in the example 1 may be provided in a hard disk drive or a floppy disk drive.

FIG. 2 is a flow chart showing a sequence of operations creating operation data of the apparatus according to the example 1.

In the apparatus, CAD data of an original drawing stored in a floppy disk is sent to the processing unit. In the processing unit, a first processing device causes the display unit to display the CAD data of the original drawing.

An operation command menu is displayed on the display unit so as to prompt the user for a desired command menu. Next, the user designates a desired original CAD drawing by using a mouse. Thereafter, a second processing device creates operation command CAD data to correspond with the designated CAD data of the original drawing. The display unit displays an operation command drawing representing an operation to correspond with the operation command CAD data created by the first processing device.

Thus, the display unit displays both the original CAD drawing and the operation command CAD drawing.

When the operation command CAD drawing is the same as the original CAD drawing, they just overlap. Thus, the display unit displays the operation command CAD drawing only. A third processing device extracts CAD data necessary for operating common machines of a group from the created operation command CAD data as numeric and character data, so as to create operation command data.

Next, a change command menu is displayed so as to prompt the user for a desired change command item. Next, the user designates data for changing data necessary for operating the common machines of the group from the operation command CAD data by using a keyboard which is a second input unit. Thus, a fifth processing device creates change command CAD data. The display unit displays a change command CAD drawing which represents the changes of the change command CAD data created by the first processing device.

Thus, the display unit displays the original CAD drawing, the operation command CAD drawing, and the change command CAD drawing. The change command CAD drawing is displayed data per se which is composed of numeric values and characters corresponding to the input changes of data of the operation command CAD data with which the common machines of the group operate. The display unit displays the numeric values and characters which compose the data. The display positions of the data are not fixed. The display positions of the data, however, are preferably in the vicinity of the corresponding operation command CAD drawing. This is because the user can easily know what operation command data should be changed and in what manner.

A sixth processing device creates operation command data by extracting data necessary for operation of common machines of a group from the operation command CAD data and the change command CAD data as numeric and character data and creates change command data. Based on the change command data, operation command data formed by extracting CAD data necessary for changing data for operating common machines of a group from the operation command CAD data in the operation command CAD data file as numeric and character data. Then, the operation command data is changed to correspond with the format of a particular machine and thereby operation data is created. After the operation data is created, a fourth processing device outputs the operation data to the particular machine so that it is actually operated based on the operation data. Next, the case where the apparatus according to the present invention is applied to a measuring machine which measures the size of a metal plate with etched holes and creates operation data will be described.

Figure 8:
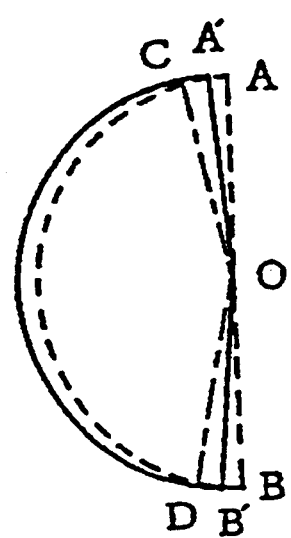
FIG. 8 shows a schematic diagram for explaining differences between an original CAD drawing and a substance to be measured.

FIG. 8 is a schematic diagram showing an original drawing of a semicircle OAB. When such a semicircle OAB is etched, a semicircle OA'B' denoted by solid lines may be sometimes formed.

When the radii of this semicircle are measured between the center O and point A and between the center O and point B by using the CAD data of the original drawing, since points A and B deviate to A' and B' respectively, the semicircle is not present in the measurement positions. Thus, an error takes place in the measuring machine. Therefore, the measuring machine cannot measure the semicircle. In the conventional apparatus, the program must be changed so as to measure the points C and D. Alternatively, the CAD data of the original drawing must be changed to the CAD data of the semicircle OCD.

Next, with reference to FIGS. 3 to 7 and 9, the present invention will be described.

FIG. 3 is CAD data of an original drawing. As shown in the figure, the CAD data comprises a figure type (circle), a line type (solid line), a color (black), coordinates X and Y of center point (0.0, 0.0), a radius R (5.0), and start and end angles of a circle (90°, 270°).

In this embodiment, the CAD data of an original drawing has been created and stored on a floppy disk. The first processing device causes the display unit to display a figure as shown in left side of FIG. 9 with the numeral of 1. This figure is the same as the semicircle OAB denoted by the dotted lines of FIG. 8.

Next, the user selects a desired command item from the operation command menu, which includes such operation command items as width measurement (two points), width measurement (parallel), and R measurement (size). In this case, to create operation data for measuring radii, the user selects the R measurement (size). Thereafter, the user designates the original drawing of the semicircle from the CAD data of the original CAD drawing displayed on the display unit by using the mouse, which is a first input unit. Then the second processing device creates operation command CAD data necessary for creating operation data to correspond with the operation command being selected. The operation data for measuring the radii requires the coordinates of the center point, the R value, and the start and end angles. It should be noted that the operation command menu may contain other items along with the above described items. Items contained in the operation command menu may be created to correspond with the operations of machines. In addition, the names of the operation command items may be freely designated. Furthermore, it is possible to designate a plurality of operation command items to one operation of each machine.

For example, in the case where a measuring machine to be operated has a width measuring capability, the second processing unit may be so constructed that if the user selects the width measurement (parallel) operation command item, the second processing device prompts him or her for inputs of any two points between two parallel lines to be measured, or that, if the user selects the width measurement (two points) operation command item, the second processing device prompts him or her for inputs of two points to be measured, whereby operation command CAD data which is necessary for the measurement is created. In other words, if necessary, one of the above-described measurement methods can be selected.

In addition, operation data irrespective of CAD data of an original drawing (turning on/off a lamp, for example) may be included in the operation command menu. By selecting this item, the second processing device causes the lamp to be turned on. Thus, almost any operation may be designated by using a mouse, and the operation data can be quickly created.

Figure 9:
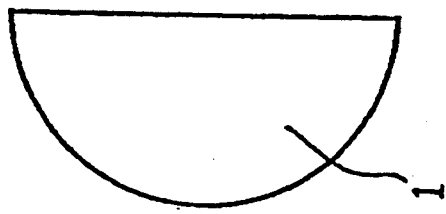
FIG. 9 shows a schematic diagram showing a CAD drawing displayed on a display unit.
Figure 9:
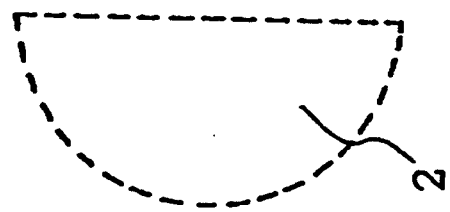
Figure 9:
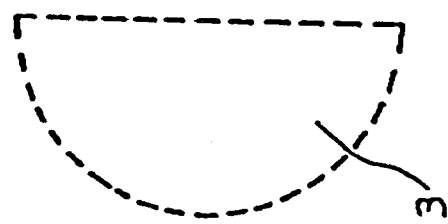

FIG. 4 is a schematic diagram showing operation command CAD data being created. The operation command CAD data comprises a figure type (circle), a line type (dotted line), a color (red), coordinates X and Y of a center point, a radius R, and start and end angles of a circle. In this case, since radii are measured, this operation command CAD data is almost the same as the CAD data of the original drawing shown in FIG. 3. The differences between these are only the line type and color. The display unit displays data as shown in the center of FIG. 9 with the numeral of 2. Since the shape of the operation command CAD data is the same as the shape of the original CAD drawing, the display unit displays the operation command drawing only. The line type and color are not always changed on the original CAD drawing. However, from a view point of easy understanding of operations for the original CAD drawing, the line type and color are preferably changed.

Next, unless the operation command CAD data is changed, operation data for measuring the points A and B of FIG. 8 is generated as the CAD data of the original drawing. However, with this operation data, as described above, an error takes place in the measuring machine. Thus, the measuring machine cannot measure the data. In this case, the operation data should be changed so that the measuring machine measures the data of the points C and D of FIG. 8 with a start angle of 110° and an end angle of 250°.

Figure 7:
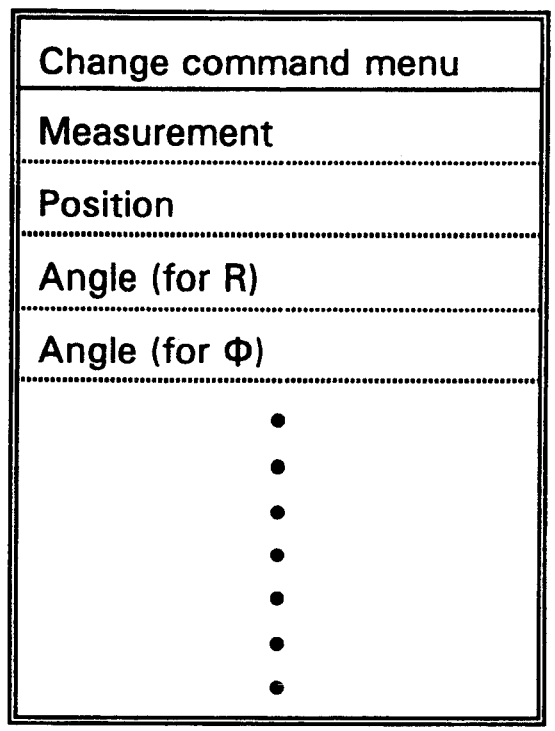
FIG. 7 shows a schematic diagram showing a change command menu.

Next, the user selects a desired item from the change command menu which includes a size, a position, an angle (for R), and an angle (for Φ) shown in FIG. 7. As with the operation command menu, the items of the change command menu are not limited to these items. In this case, since the start angle data and the end angle data of the circle are changed, the user selects the angle (for R). Thereafter, the user inputs data for changing the angle from the keyboard. In this case, data where the start angle is increased by 20° and the end angle is decreased by 20° is input. After the data is input, the sixth processing device creates change command CAD data. FIG. 5 shows the change command CAD data being created.

The change command CAD data comprises a figure type (characters), a color type (blue), coordinates X and Y of a character display position, and data to be changed. Since the figure type is characters, characters and numeric values as a figure are displayed on the display unit.

Thus, the first processing device causes the display unit to display data as shown in the right side of FIG. 9 with the numeral of 3. The display position is not fixed. However, the data is preferably displayed in the vicinity of the operation command CAD drawing. This is so that the user can easily know what operation command drawing is changed. In this example, as the display position, the coordinates of the center points of both the CAD data of the original drawing and the operation command CAD data can be used as they are.

Next, the sixth processing device extracts CAD data necessary for operating the measuring machine from the operation command CAD data shown in FIG. 4 as numeric and character data, so as to create operation command data. In this case, since operation data for measuring radii is created, the third processing device extracts the coordinates X and Y of the center point (0.0, 0.0), the radius R (5.0), and the start and end angles (90°, 270°) from the operation command CAD data rather than the figure type and line type.

Next, the sixth processing device extracts changes of operation command CAD data, necessary for operating the measuring machine, from the change command CAD data shown in FIG. 5 as numeric and character data, so as to create change command data. In other words, with data which was input for creating change command CAD data, data of changes shown in FIG. 5 can be extracted, thereby creating change command data.

Next, the sixth processing device changes the operation command data to correspond with the change command data. Thereafter, the eighth processing device changes the start angle from 90° to 110°, and the end angle from 270° to 250° without changes of the center position and the radius as other operation command data. With this data, the eighth processing device creates operation data.

Thus, operation data where the radius of CD shown in FIG. 8 is measured is created. Therefore, no error takes place in the measuring machine. In other words, only the sixth processing device performs a sequence of operations of creating operation command data, creating change command data, changing operation command data, and creating operation data rather than storing operation command data and change command data. Thus, the apparatus can be simply constructed and thereby operation data of a particular machine can be directly and quickly created. After the operation data is created, the fourth processing device outputs the operation data and causes the measuring machine to start measuring the radius.

As described above, according to the present invention, with the CAD data of an original drawing, operation data is created. However, it should be noted that without changes of CAD data of original drawing or program, operation data can be created by using data included in the CAD data of an original drawing. In addition, by using data irrespective of CAD data of an original drawing, operation data can be easily created by the construction of the second processing device and the operation command menu.

Although some data may be input from the keyboard, most commands can be designated to the processing devices by using the mouse, thereby causing the processing devices almost automatically to create data. Thus, the operation data can be very quickly created.

In addition, operation command data of common machines of a group is created and thereby operation data thereof is created in succession. Thus, the operation data can be very quickly created.

Further in addition, CAD data includes original drawing data, operation command data, and change command data. Thus, with a drawing shown on the display unit, the user can know what commands are made for the original drawings and how these drawings are changed. Therefore, the user can easily know relation of each data.

As described above, the present invention has excellent advantageous effects.

Example 2

Figures 12, 13:
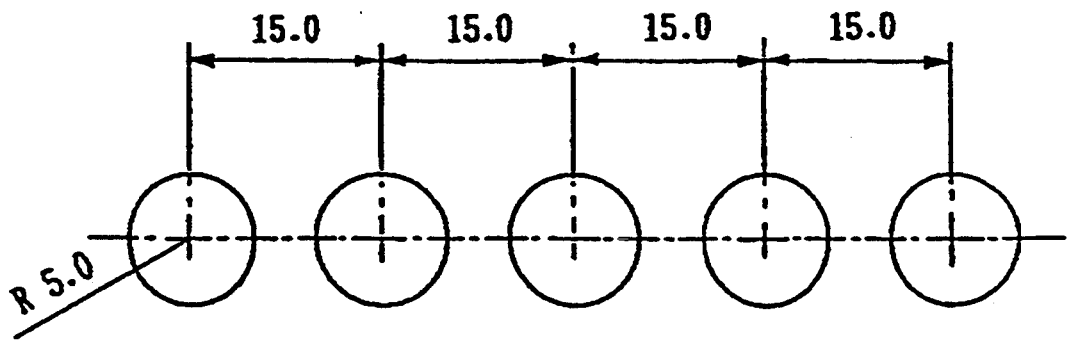
FIG. 12 shows a schematic diagram showing change command CAD data.
FIG. 13 shows a schematic diagram illustrating differences between an original CAD drawing and a substance to be measured.

Next, the case where operation data for measuring radii of five circles disposed at intervals of 15.0 mm in the direction of the X coordinate will be described in detail. In this case, each of these circles accords with CAD data of an original drawing of one circle. FIG. 13 is a schematic diagram showing the positions of these circles.

FIG. 10 is a schematic diagram showing CAD data of an original drawing. The CAD data of the original drawing contains data of a figure type (circle), a line type (solid line), a color (black), coordinates X and Y of a center point, a radius value R and start and end angles of a circle. Thus, the CAD data of the original drawing is data of one circle.

In the case of an etching product, holes with the same shape may be often made on a metal plate. Thus, the CAD data of the original drawing, as shown in FIG. 10, may be often be data of one drawing.

In this case, when operation data for measuring the radii of all the circles shown in FIG. 13 is created by using the CAD data of the original drawing shown in FIG. 10, the program must be changed or the CAD data of the original drawing must be changed to the data shown in FIG. 13.

Figure 14:
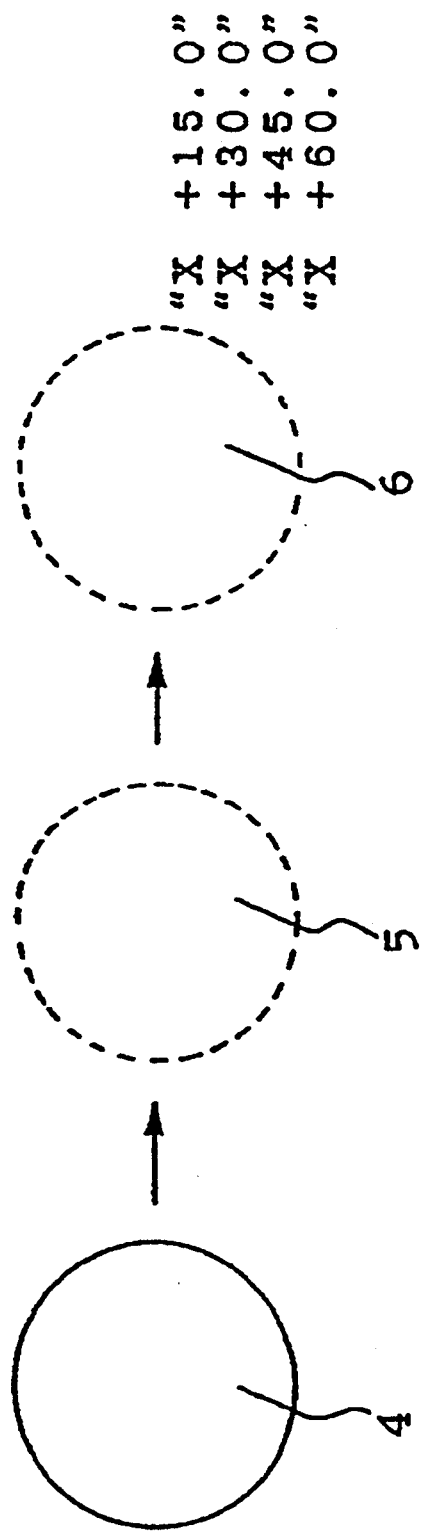
FIG. 14 shows a schematic diagram illustrating a CAD drawing displayed on the display unit.

In this example 2, however, the first processing device causes the display unit to display an original CAD drawing as shown in FIG. 14 with the numeral of 1.

Figure 6:
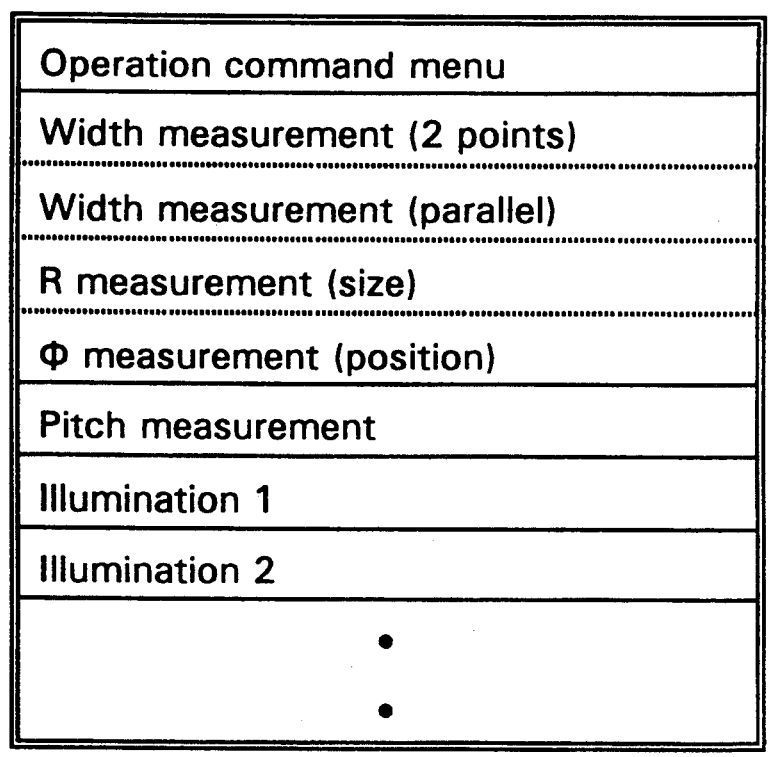
FIG. 6 shows a schematic diagram showing an operation command menu.

Next, the user selects the R measurement (size) item from the operation command menu shown in FIG. 6. Thereafter, the user designates the circle of the CAD data of the original drawing shown on the display unit by using the mouse, which is the first input unit.

Thereafter, the second processing device creates operation command CAD data. Thus, an operation command CAD drawing is displayed as shown in FIG. 14 with the numeral of 5.

FIG. 11 shows operation command CAD data being created. In the operation command CAD data, only line type and color are changed from those of the CAD data of the original drawing. This is because the user can easily know what operations are performed over the original drawing.

With the resultant operation command CAD data, operation data for measuring only one leftmost circle shown in FIG. 13 is created. The user thereafter selects a corresponding item from the change command menu shown in FIG. 7.

To create operation data with changes of circle positions, the user selects the position item. Thereafter, the user inputs data to be changed from the keyboard.

Since the circles are disposed at intervals of 15 mm in the direction of X coordinate, the user inputs data where positions of center points of circles are incremented by 15.0 mm (namely, 15.0, 30.0, 45.0, and 60.0 mm). The resultant change command CAD drawing is displayed on the display unit, as shown in FIG. 14 with the numeral of 6.

Thereafter, as in the above-described example 1, by the sixth processing device, CAD data necessary for operating a measuring machine is extracted from the operation command CAD data as numeric and character data and thereby operation command data is created. Next, likewise, by the sixth processing device, data necessary for changing data used for operating a measuring device is extracted from the operation command CAD data in the change command CAD data as numeric and character data, and thereby change command data is created. In other words, data, which has been inputted when the change command CAD data was created and is shown in FIG. 5 as change data per se, is extracted and thereby the change command data is created.

In addition, the sixth processing device changes the operation command data based on the change command data. Thereafter, the sixth processing device changes the operation command data to correspond with the format of the measuring machine and thereby creates operation data.

In other words, the sixth processing device successively performs three types of operations to create the operation data by using the operation command CAD data and the change command CAD data without storing the operation command data and change command data.

Thus, without changes of both the CAD data of original drawing and program, a plurality of operation data can be created based on single CAD data of an original drawing.

As for advantageous effect according to the present invention, with CAD data of original drawing, operation data of an operating machine can be created. In addition, without changes of both CAD data of an original drawing and program, desired operation data can be created quickly and successively.

Moreover, since original drawing data, operation command data, and change command data are provided as CAD data, the user can easily know what operation commands are performed for the original drawing and how they have been changed.

What is claimed is:

1. An apparatus for producing operation data comprising:
    an input unit;
    a display unit for displaying at least a computer aided design drawing, computer aided design data, an operation command menu, a change command menu and input commands for processing means;
    a storage unit including
    (A) a computer aided design data file having a plurality of storage locations for storing computer aided design data of an original drawing;
    (B) a command menu data file for storing data necessary for displaying the operation command menu, the change command menu, the operation data change command menu, and the input commands for processing means;
    (C) an operation command computer aided design data file for storing operation command computer aided design data;
    (D) an operation command data file for storing operation command data; and
    a processing unit having
    (a) a first processing device for performing processes including editing and displaying a computer aided design drawing;
    (b) a second processing device for creating operation command computer aided design data and for storing the operation command computer aided design data in the operation command computer aided design data file, the operation command computer aided design data being created by selecting an operation command item from the operation command menu, designating a computer aided design drawing of an original drawing displayed on the display unit through a first process with the input unit, and inputting data when necessary;
    (c) a third processing device for creating operation data and for storing the operation data in an operation data file, the operation data being created by changing operation command data stored in the operation command data file to correspond with a format of a specific machine of common machines of group, the operation command data being created by extracting computer aided design data necessary for operating the common machines of the group from the operation command computer aided design data as numeric and character data; and
    (d) a fourth processing device for outputting the operation data, the operation data being changed to correspond with the format of the specific machine.

2. An apparatus according to claim 1, wherein the machine is a machine tool.

3. An apparatus according to claim 1, wherein the machine is a measuring machine.

4. An apparatus for producing operation data comprising:
    an input unit;
    a display unit displaying at least a computer aided design drawing computer aided design data, an operation command menu, a change command menu and input commands for processing means;
    a storage unit including
    (A) a computer aided design data file having a plurality of storage locations for storing computer aided design data of an original drawing;
    (B) a command menu data file for storing data necessary for displaying the operation command menu, the change command menu, the operation data change command menu, and the commands for processing means;
    (C) an operation command computer aided design data file for storing operation command computer aided design data;
    (D) a change command computer aided design data file for storing change command computer aided design data;
    (E) an operation data file for storing operation data; and
    a processing unit having
    (a) a first processing device for performing processes, including editing and displaying a computer aided design drawing;
    (b) a second processing device for creating operation command computer aided design data and for storing the operation command computer aided design data in the operation command computer aided design data file, the operation command computer aided design data being created by selecting an operation command item on the operation command menu disposed on the display unit, designating a computer aided design drawing of an original drawing displayed on the display unit through a first process with the input unit, and inputting data when necessary;

(c) a third processing device for creating change command computer aided design data and for storing the change-command computer aided design data in the change command computer aided design data file, the change command computer aided design data being created by selecting a change command item on the change command menu displayed on the display unit when necessary, and inputting data for changing the operation command computer aided design data;

(d) a fourth processing device for creating operation data and for storing the data in the operation data file, the operation data being created by extracting computer aided design data necessary for operating common machines of a group as numeric and character data to thereby form operation command data, extracting computer aided design data necessary for operating common machines of the group from the change command computer aided design data to form change command data, changing the operation command data by means of the change command data and extracting data necessary for operating a specific machine of the group; and (e) a fifth processing device for outputting the operation data.

5. An apparatus according to claim 4, wherein the machine is a machine tool.

6. An apparatus according to claim 4, wherein the machine is a measuring machine.

7. An apparatus for producing operation data comprising:

an input unit;
a display unit for displaying at least a computer aided design drawing, computer aided design data, an operation command menu, a change command menu and input commands for processing means;
a storage unit including
(A) a computer aided design data file having a plurality of storage locations for storing computer aided design data of an original drawing;
(B) a command menu data file for storing data necessary for displaying the operation command menu, the change command menu, the operation data change command menu, and the input commands for processing means;
(C) an operation command computer aided design data file for storing operation command computer aided design data;
(D) an operation command data file for storing operation command data;
(E) an operation data change command computer aided design data file for storing operation data change command computer aided design data;
(F) a change operation data file for storing change operation data; and
a processing unit having
(a) a first processing device for performing processes including editing and displaying a computer aided design drawing;

(b) a second processing device for creating operation command computer aided design data and for storing the operation command computer aided design data in the operation command computer aided design data file, the operation command computer aided design data being created by selecting an operation command item on the operation command menu disposed on the display unit, designating a computer aided design drawing of an original drawing displayed on the display unit through a first process with the input unit, and inputting data when necessary;

(c) a third processing device for creating operation data and for storing the operation data in an operation data file, the operation data being created by changing operation command data stored in the operation command data file to correspond with the format of a specific machine from common machines of group, the operation command data being created by extracting computer aided design data necessary for operating the common machines of the group from the operation command computer aided design data as numeric and character data; and (d) a fourth processing device for creating operation data change command computer aided design data and for storing the operation data change command computer aided design data in an operation data change command computer aided design data file, the operation data change command computer aided design data being created by selecting a change command item on the operation data change command menu displayed on the display unit when necessary, and inputting data for changing the operation data;

(e) an fifth processing device for creating change operation data and for storing the change operation data in a change operation data file, the change operation data being created by changing operation data stored in an operation data file based on operation data change command data, the operation data change command data being created by extracting the computer aided design data necessary for changing data of the operation data from the operation data change command computer aided design data as numeric and character data; and (f) a sixth processing device for outputting the change operation data changed based on the operation data change command data.

8. An apparatus according to claim 7, wherein the machine is a machine tool.

9. An apparatus according to claim 7, wherein the machine is a measuring machine.

10. An apparatus for producing operation data comprising:

an input unit;
a display unit for displaying at least a computer aided design drawing, computer aided design data, an operation command menu, a change command menu and input commands for processing means;
a storage unit including
(A) a computer aided design data file having a plurality of storage locations for storing computer aided design data of an original drawing;
(B) a command menu data file for storing data necessary for displaying the operation command menu, the change command menu, the operation data change command menu, and the input commands for processing means;

(C) an operation command computer aided design data for storing operation command computer aided design data;

(D) an operation command data file for storing operation data;

(E) an operation data change command computer aided design data file for storing operation data change command computer aided design data;

(F) a change operation data file for storing change operation data; and a processing unit having (a) a first processing device for performing processes including editing and displaying a computer aided design drawing;

(b) a second processing device for creating operation command computer aided design data and for storing the operation command computer aided design data in the operation command computer aided design data file, the operation command computer aided design data being created by selecting an operation command item on the operation command menu disposed on the display unit, designating a computer aided design drawing of an original drawing displayed on the display unit through a first process with the input unit, and inputting data when necessary;

(c) a third processing device for creating operation data and for storing the operation data in an operation data file, the operation data being created by changing operation command data stored in the operation command data file to correspond with the format of specific machine of common machines of a group, the operation command data being created by extracting computer aided design data necessary for operating the common machines of the group from the operation command computer aided design data as numeric and character data; and (d) a fourth processing device for creating the operation data change command computer aided design data and for storing the data in the operation data change command computer aided design data file, the operation data change command computer aided design data being created by selecting a change command item on the operation data change command menu displayed on the display unit when necessary, and inputting data for changing the operation data;

(e) an eighth processing device for creating change operation data and for storing the change operation data in the change operation data file, the change operation data being created by changing the operation data stored in the operation data file based on operation data change command data, the operation data change command data being created by extracting the computer aided design data for changing the operation data from the operation data change command computer aided design data as numeric and character data.

11. An apparatus according to claim 10, wherein the machine is a machine tool.

12. An apparatus according to claim 10, wherein the machine is a measuring machine.

* * * * *